(12) United States Patent
Hewitt et al.

(10) Patent No.: US 8,308,588 B2
(45) Date of Patent: Nov. 13, 2012

(54) TIMING CHAIN PIVOTING GUIDE HAVING A RUBBER SPRING ELEMENT

(75) Inventors: Jeffrey Hewitt, Windsor (CA); Lucian Botez, Novi, MI (US); Wolfgang Lorz, Fuerth (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 18 days.

(21) Appl. No.: 12/768,116

(22) Filed: Apr. 27, 2010

(65) Prior Publication Data

US 2010/0273590 A1    Oct. 28, 2010

Related U.S. Application Data

(60) Provisional application No. 61/173,446, filed on Apr. 28, 2009.

(51) Int. Cl.
*F16H 7/08* (2006.01)

(52) U.S. Cl. ........................................... 474/111

(58) Field of Classification Search .................. 474/101, 474/111, 140; 384/220; 267/153, 140, 292
See application file for complete search history.

(56) References Cited

U.S. PATENT DOCUMENTS

| | | | | |
|---|---|---|---|---|
| 5,026,031 | A * | 6/1991 | Court | 267/140.12 |
| 5,033,871 | A * | 7/1991 | Ide | 384/98 |
| 5,190,269 | A * | 3/1993 | Ikeda et al. | 267/140.12 |
| 5,665,019 | A * | 9/1997 | Sheffer et al. | 474/111 |
| 5,846,150 | A * | 12/1998 | Wigsten | 474/140 |
| 6,312,353 | B1 * | 11/2001 | Oba | 474/140 |
| 6,416,226 | B1 * | 7/2002 | Provence et al. | 384/220 |
| 6,585,614 | B1 * | 7/2003 | Kumakura | 474/111 |
| 6,817,599 | B2 * | 11/2004 | Kato et al. | 267/141.2 |
| 6,837,345 | B1 * | 1/2005 | Lauble et al. | 188/378 |
| 7,010,843 | B2 * | 3/2006 | Haneishi et al. | 29/451 |

* cited by examiner

*Primary Examiner* — Michael Mansen
*Assistant Examiner* — Mark K Buse
(74) *Attorney, Agent, or Firm* — Lucas & Mercanti, LLP; Klaus P. Stoffel

(57) ABSTRACT

The rubber element is positioned in the drive end of the chain guide and provides dampening and noise reduction for the guide, thereby reducing the overall noise from the meshing of the chain and the guide.

8 Claims, 7 Drawing Sheets

TIMING CHAIN PIVOTING GUIDE HAVING A RUBBER SPRING ELEMENT

FIELD OF THE INVENTION

This invention relates to internal combustion engines and more specifically to tight-side guides used on timing chain drive systems for the engine.

BACKGROUND OF THE INVENTION

Tight side guides on timing chain drive systems are conventionally rigidly mounted against the tight strand and guide the chain on the tight side into engagement with the drive wheel. Excessive vibrations and noise, also known as the meshing noise, are caused by the timing chain meshing at engine idle speeds. These noises occur not only from the chain meshing with the wheels (sprockets) as well as the chain engagement with the guides. Periodic transversal chain movement relative to the wheel revolution can drive the timing system into resonance if their frequencies, known as meshing frequencies, match one of the many natural frequencies of the system.

OBJECT OF THE INVENTION

It is the object of the present invention to reduce noise and vibration generated by the interaction between the chain, the sprockets, and the chain guide system.

These and other objects of the present invention are more readily understood by reference to the following description of the invention.

SUMMARY OF THE INVENTION

The objects of the invention are obtained by employing a rubber element on the drive side of the rail guide for the timing chain drive system that acts on the tight side. This rubber element moves the timing chain natural frequency that is close to the meshing frequency at idle speed to a lower value and therefore below the meshing frequency of the lowest possible idle speed. In this way, the timing system does not enter into resonant behavior and the timing chain noise level is dropped to an acceptable level. It has additionally been noted that the rubber element introduces additional dampening into the system. This increased dampening significantly decreases the system's response even if the system is close to or at the resonance point.

Broadly, the present invention can be defined as a tight side tensioning guide for a timing chain drive system of an internal combustion engine, the system having a drive wheel, at least one driven wheel and a chain connecting the drive wheel and driven wheel, the guide positioned on the tight side between the drive wheel and the driven wheel, the guide comprising: a guide rail having a guide surface for the chain on one side of the rail, a drive end facing the drive wheel, a driven end facing the driven wheel, a drive end mounting hole for a drive end mounting bolt and driven end mounting hole for a driven end mounting bolt, the drive end mounting hole and the driven end mounting hole being on the other side of the rail; and a rubber element positioned in the driven end mounting hole and having a bore for the drive end mounting bolt.

Preferably, the rubber element is a rubber sleeve that extends axially through the drive end mounting hole and a rubber ring extending radially outward from the sleeve.

More preferably, the ring extends axially along the sleeve from one axial end of the sleeve to the axial middle of the sleeve.

The ring preferably has a rubber shoulder which extends radially outward from the ring towards the guide surface. The ring can have two shoulders, one extending towards the guide surface and another extending away from the guide surface to provide bidirectional action.

More preferably, the sleeve is corrugated both on its inside and on its outside surfaces.

Even more preferably, the ring has a plurality of axial blind bores spaced radially outward from the sleeve which provide additional cushioning to the rubber element.

More preferably, bushings are positioned between the mounting bolts and the inside of the rubber sleeve or the inside of the driven end mounting hole.

These and other aspects of the present invention may be more readily understood by reference to one or more of the following drawings which are presented here for purposes of illustration.

DETAILED DESCRIPTION OF THE DRAWINGS

Figure 1:
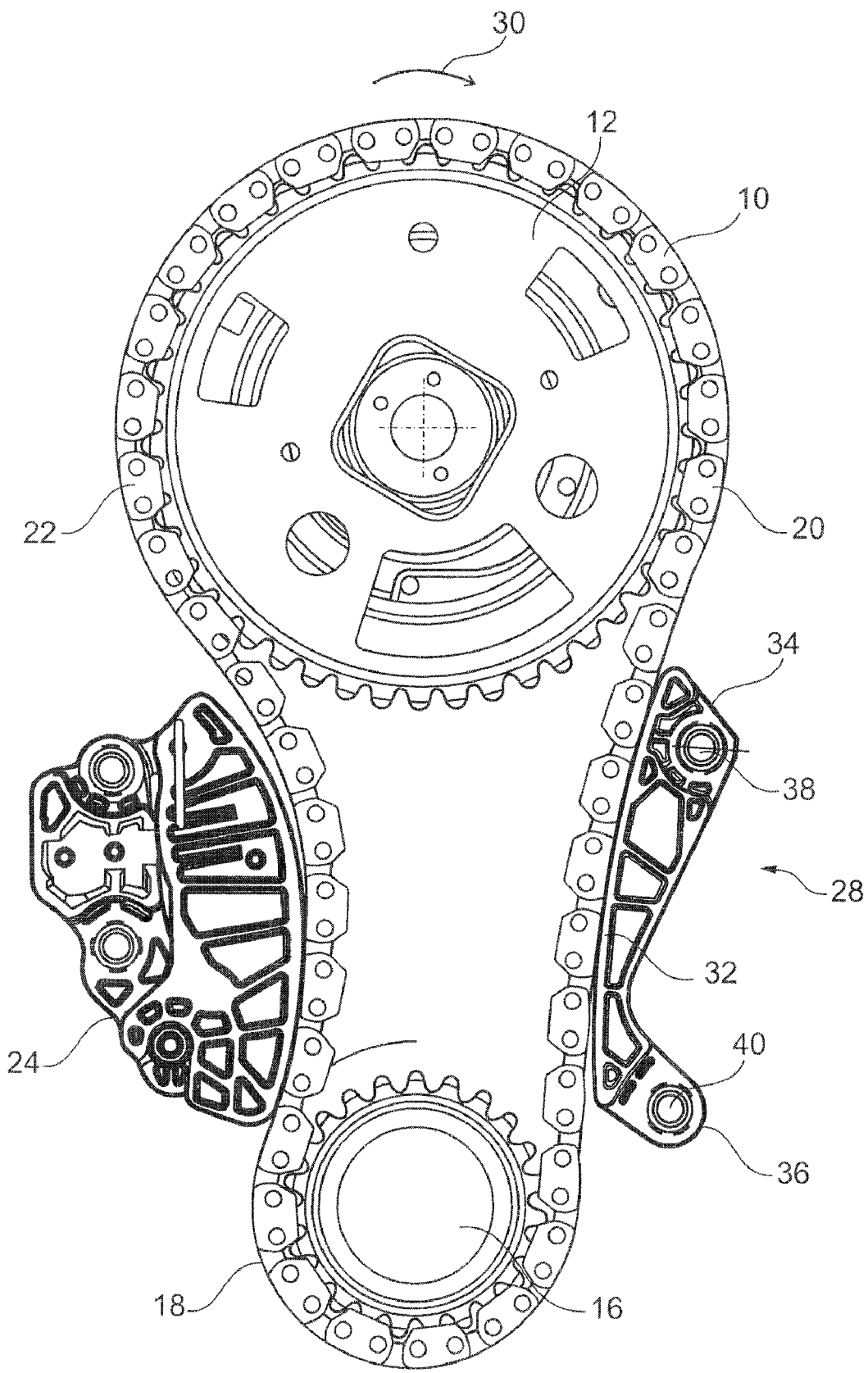
FIG. 1 illustrates a timing chain drive system.

As illustrated in FIG. 1, timing chain drive system 10 has drive wheel 16 and driven wheel 12. Chain 18 encircles wheels 12 and 16. Chain 18 is driven by drive wheel 16 and has tight strand 20 and slack strand 22. It will be noted that slack strand 22 extends from drive wheel 16 to driven wheel 12 in the route of chain 18. Positioned along chain 18 is slack side chain tensioner 24, and tight side tension guide 28. Tight side tension guide 28 is the guide of the invention.

Figure 2:
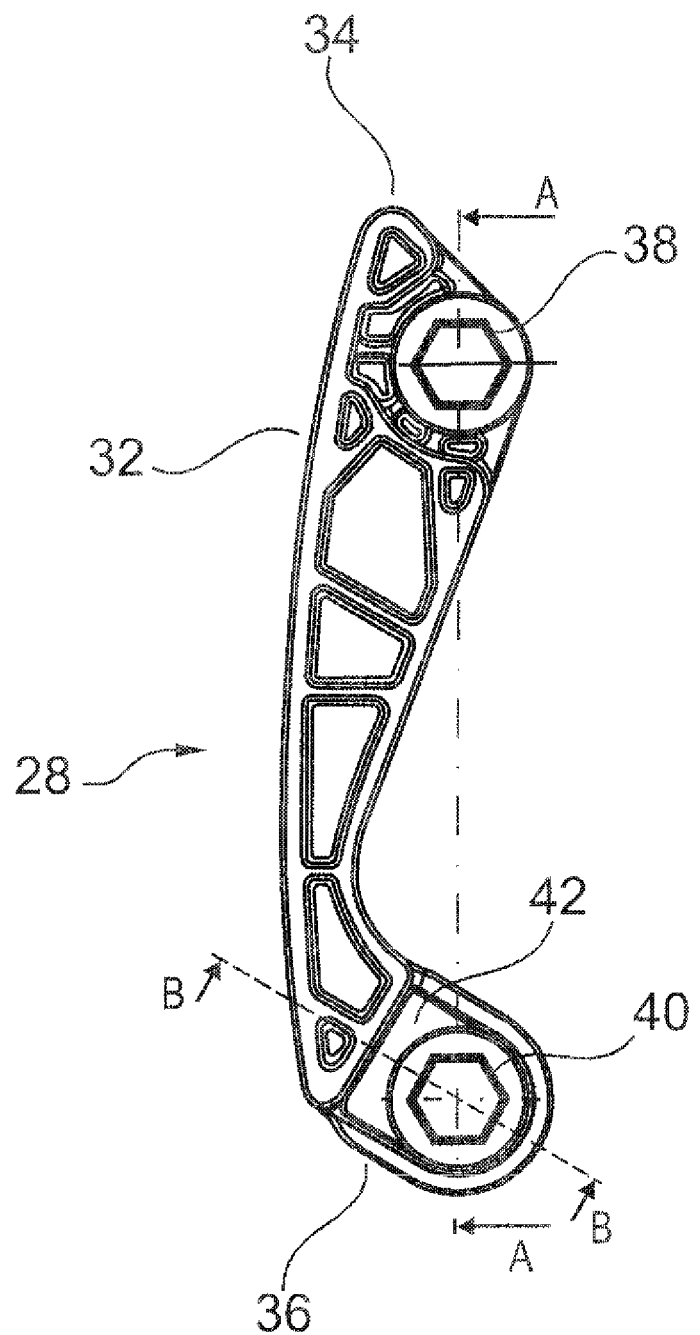
FIG. 2 illustrates the tight side tensioning guide of the invention.

As illustrated in FIGS. 1 and 2, tight side tension guide 28 has guide surface 32 on which chain 18 is guided. Tight side tension guide 28 has drive end 36 and driven end 34. Tight side tension guide 28 is mounted against the frame in the engine compartment by means of drive end mounting bolt 40 and driven end mounting bolt 38. As shown in FIG. 2, rubber element 42 is positioned in drive end 36 and extends towards guide surface 32.

Figure 3:
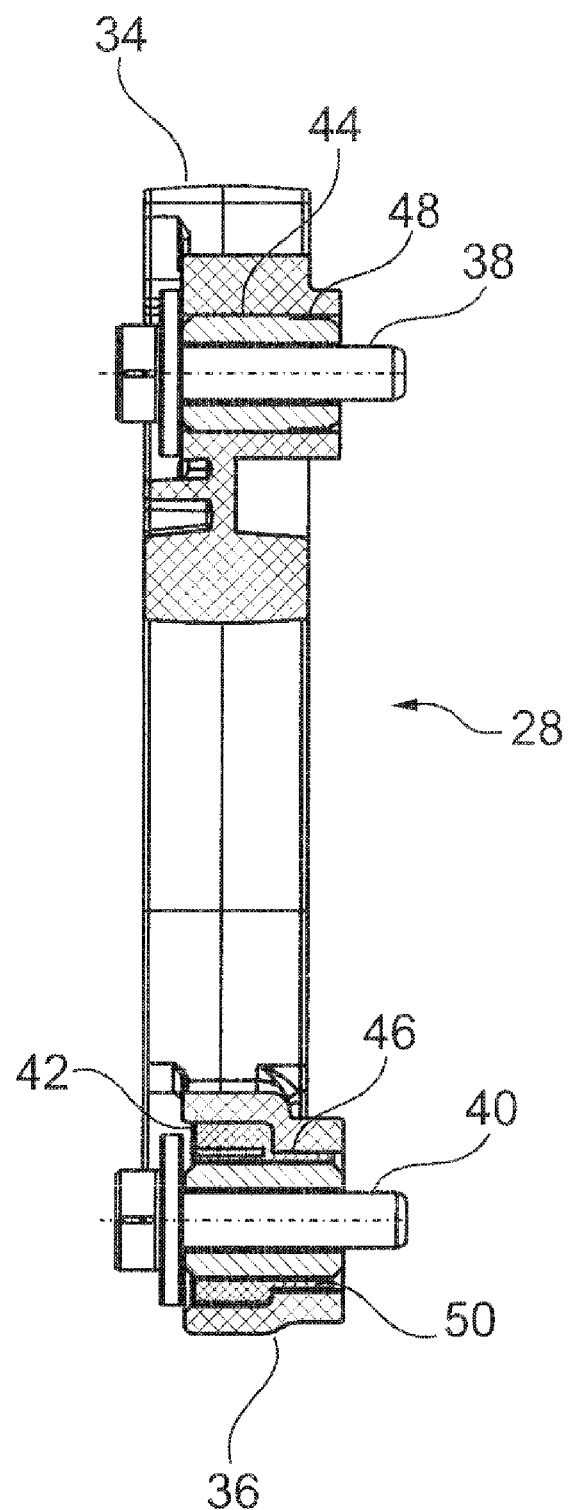
FIG. 3 illustrates the tight side tensioning guide of FIG. 2 taken along lines A-A.

FIG. 3 illustrates guide 28 of FIG. 2 taken along line A-A of FIG. 2. Guide 28 has drive end mounting hole 46 and driven end mounting hole 44 for accommodating the drive end mounting bolt 40 and driven end mounting bolt 38. Spaced around drive end mounting bolt 40 is drive end bushing 50 and positioned around driven end mounting bolt 38 is driven end bushing 48. As can be seen in FIG. 3, rubber element 42 is positioned in drive end mounting hole 46 on the outside of drive end bushing 50.

Figure 4:
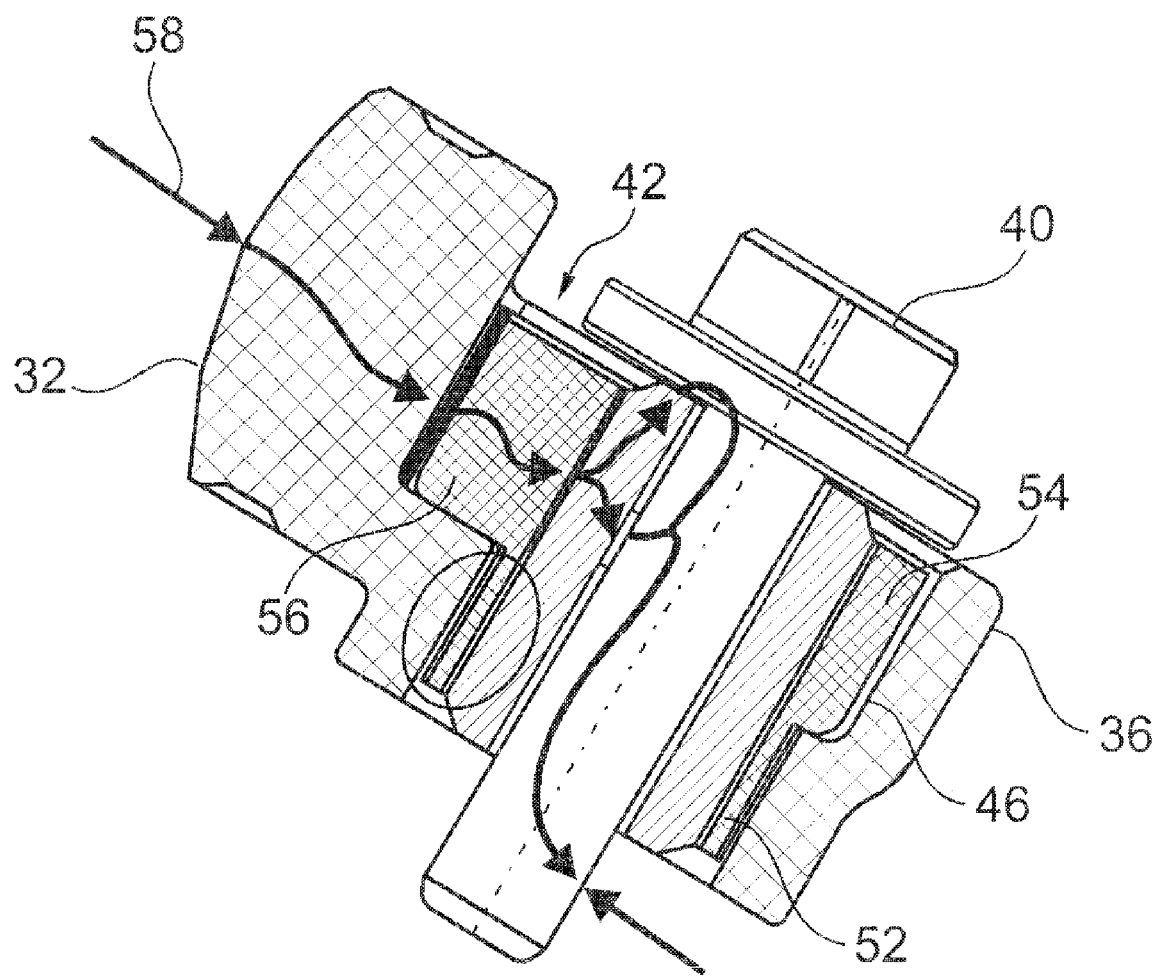
FIG. 4 illustrates the tight side tensioning guide taken along lines B-B of FIG. 2.

FIG. 4 illustrates a detailed illustration of drive end 36 of guide 28 taken along lines B-B of FIG. 2. As shown, rubber element 42 comprises a rubber sleeve 52 which extends axially through drive end mounting hole 46. Surrounding rubber sleeve 52 is rubber ring 54. As can be seen in FIG. 4, rubber ring 54 extends axially along sleeve 52 from an axial end of sleeve 52 to approximately the middle of sleeve 52. Extending outward from ring 54 is rubber shoulder 56. As illustrated in FIG. 4, rubber shoulder 56 extends towards guide surface 32 so as to face the force 58 from chain 18 as it is guided along guide surface 32 of guide 28. When the guide 28 is placed and secured onto the timing chain drive system 10, the force 58 applied by the chain 18 on the guide 28 is transmitted on the drive end mounting bolt 40 mainly through the shoulder 56 of the ring 54, creating a flexible joint at a lower mounting location due to a wavy shape of the sleeve 52.

Figure 5:
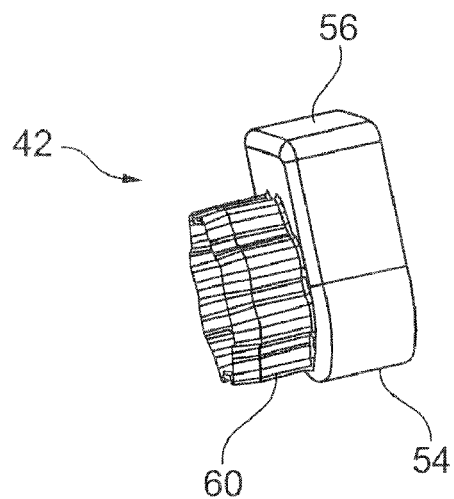
FIGS. 5-7 illustrate the rubber element of the invention.
Figure 6:
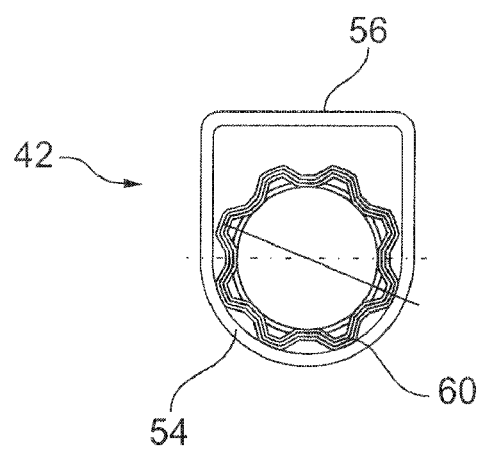
Figure 7:
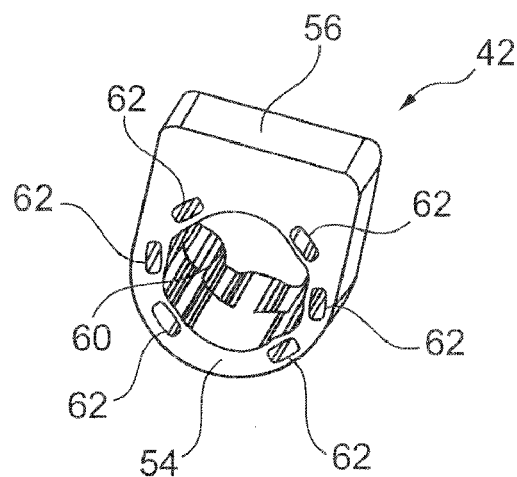

FIGS. 5-7 illustrate rubber element 42. FIG. 5 is a perspective view of rubber element 42 illustrating rubber sleeve 52 as a corrugated sleeve 60. Rubber ring 54 extends radially outward from rubber sleeve 60 and shoulder 56 extends radially outward from ring 54.

FIG. 6 is a front view of rubber element 42 while FIG. 7 is a back view of rubber element 42 showing blind holes 62 positioned in ring 54. As can be seen in FIG. 7, blind holes 62 do not extend through ring 54.

Figure 8:
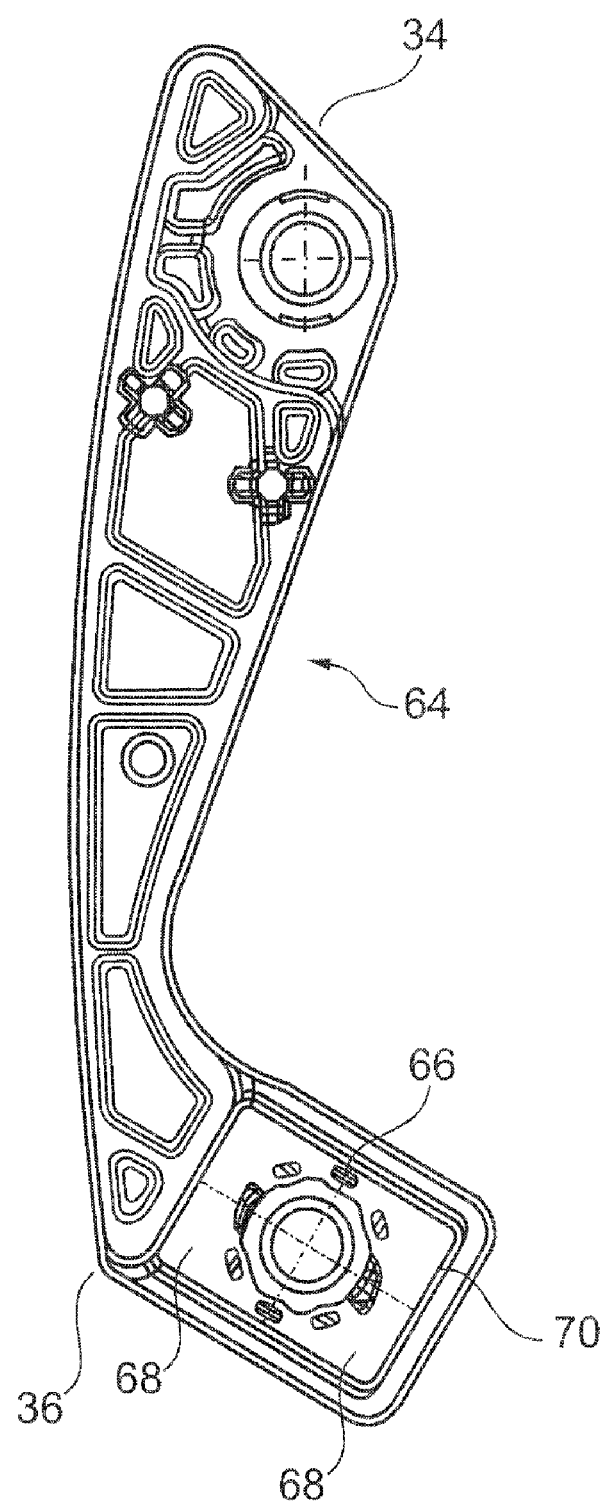
FIG. 8 illustrates a tight side chain tensioning guide with a bidirectional rubber element.
Figure 9:
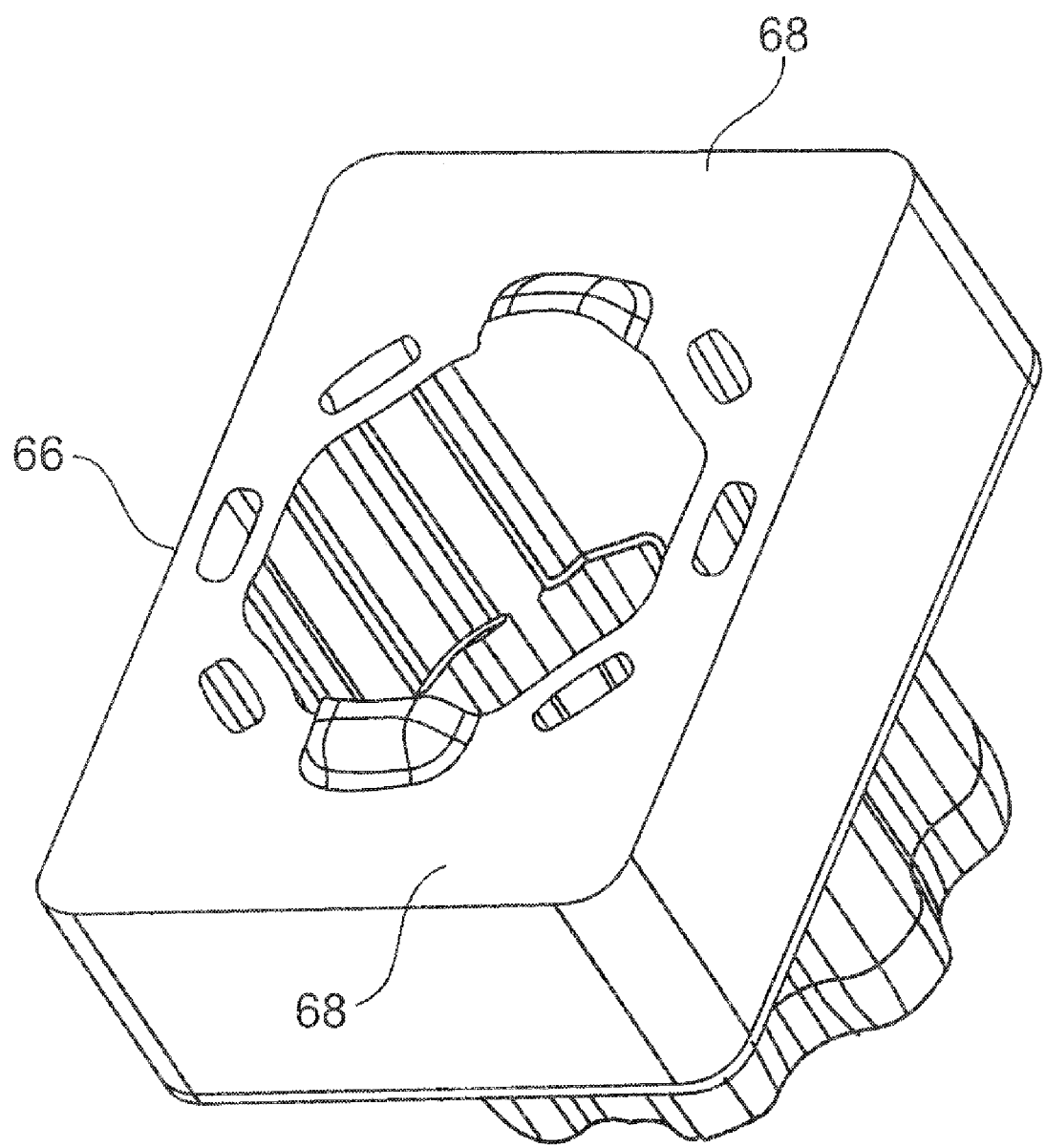
FIG. 9 illustrates a perspective view of the bidirectional rubber element of FIG. 8.

FIGS. 8 and 9 illustrate tight side tension guide 64 with bidirectional rubber element 66 with two rubber shoulders 68 mounted in drive end mounting hole 70.

Rubber element 42, 66 is suitably made from rubber, both synthetic and natural. Switchable rubber include acrylic rubber (ACM, a copolymer of ethyl butyl acrylate). As illustrated in FIG. 4, the corrugated nature of sleeve 60 provides spacing between the inner surface of drive end mounting hole 46 and the outside surface of sleeve 60.

As can be seen in FIGS. 4 and 8, drive end mounting hole 46, 70 have an internal surface configuration to accommodate the outside surface configuration of rubber element 42, 66.

LIST OF REFERENCE NUMERALS 10 timing chain drive system
12 driven wheel
16 drive wheel
18 chain
20 tight strand (side)
22 slack strand (side)
24 slack side chain tensioner
28 tight side tension guide
30 rotational direction of system
32 guide surface
34 driven end
36 drive end
38 driven end mounting bolt
40 drive end mounting bolt
42 rubber element
44 driven end mounting hole
46 drive end mounting hole
48 driven end bushing
50 drive end bushing
52 rubber sleeve
54 rubber ring
56 rubber shoulder
58 Force arrow from chain
60 corrugated sleeve
62 blind holes
64 tight side tension guide
66 bidirectional rubber element
68 rubber shoulder
70 drive end mounting hole

The invention claimed is:

1. A tight side tensioning guide for a timing chain drive system of an internal combustion engine, the system having a drive wheel, at least one driven wheel and a chain connecting the drive wheel and driven wheel, the guide positioned on the tight side between the drive wheel and the driven wheel, the guide comprising:
   a guide rail having a guide surface for the chain on one side of the rail;
   a drive end facing the drive wheel;
   a driven end facing the driven wheel;
   a drive end mounting hole for a drive end mounting bolt and driven end mounting hole for a driven end mounting bolt, the drive end mounting hole and the driven end mounting hole being on the other side of the rail; and
   a single rubber element positioned entirely within the drive end mounting hole and having a bore for the drive end mounting bolt,
   wherein the rubber element extends axially through the drive end mounting hole and includes a rubber ring and a corrugated rubber sleeve, the ring extending radially outwardly from the corrugated rubber sleeve, the sleeve has an outer and an inner profile that both consist of a series of peaks and valleys.

2. The guide of claim 1, wherein the ring extends axially along the sleeve from one axial end of the sleeve to the axial middle of the sleeve.

3. The guide of claim 2, wherein the ring has a rubber shoulder extending radially outward from the ring and towards the guide surface.

4. The guide of claim 2, wherein there are two rubber shoulders each extending radially outward from the ring, one towards the guide surface and one away from the guide surface.

5. The guide of claim 1, wherein the ring has a plurality of axial blind bores spaced radially outward from the sleeve.

6. The guide of claim 1, wherein a driven end bushing is positioned in the driven end mounting hole for accommodating the driven end mounting bolt.

7. The guide of claim 1, wherein a drive end bushing is positioned in the sleeve for accommodating the drive end mounting bolt.

8. The guide of claim 1, wherein the drive end mounting hole has a stepped wall.

* * * * *